Feb. 23, 1960 H. D. HURT 2,925,846
MULTISERVICE PROTECTOR UNIT FOR PNEUMATIC TIRES AND TUBES
Filed Feb. 8, 1957 4 Sheets-Sheet 4
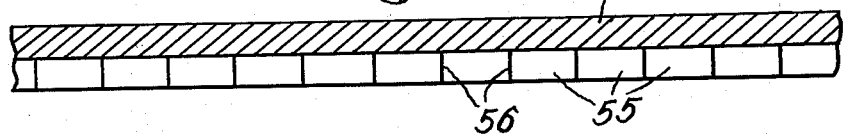
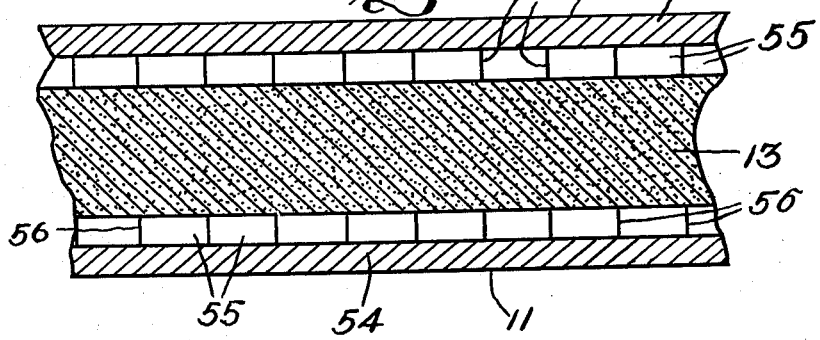
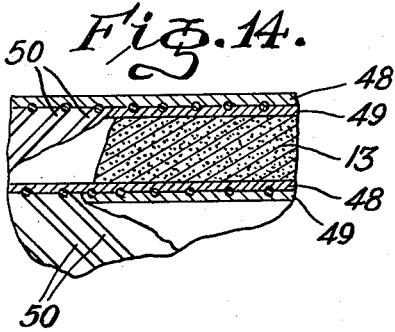
INVENTOR.
Hansford D. Hurt United States Patent Office 2,925,846
Patented Feb. 23, 1960

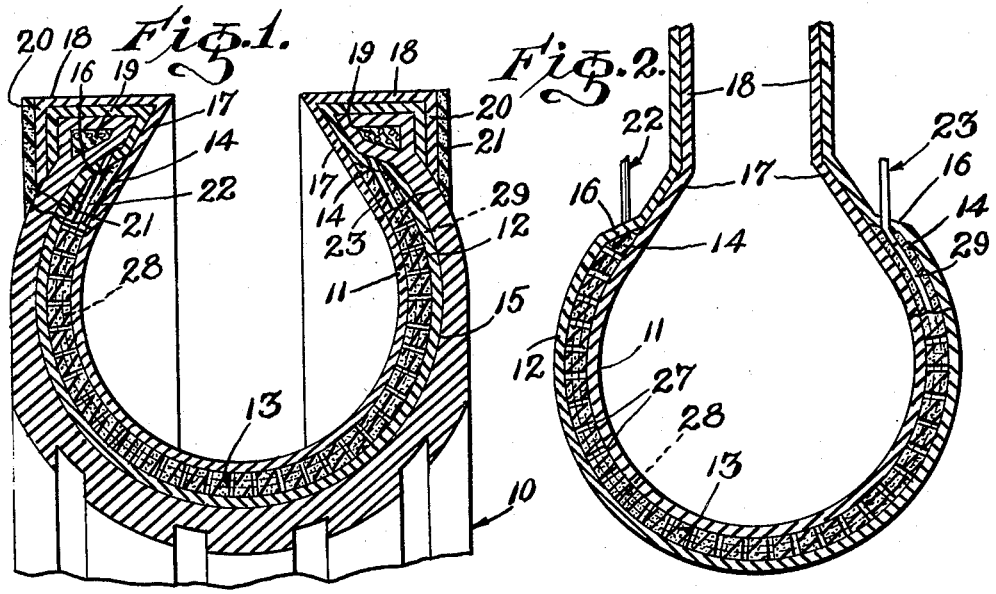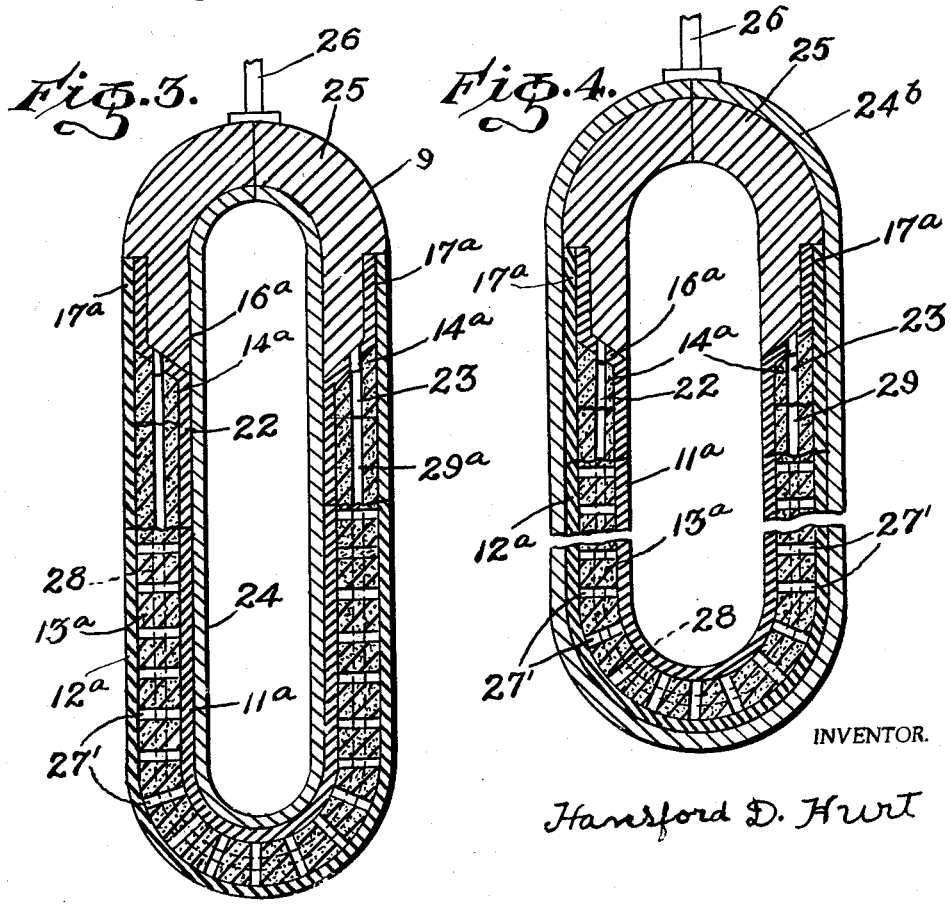

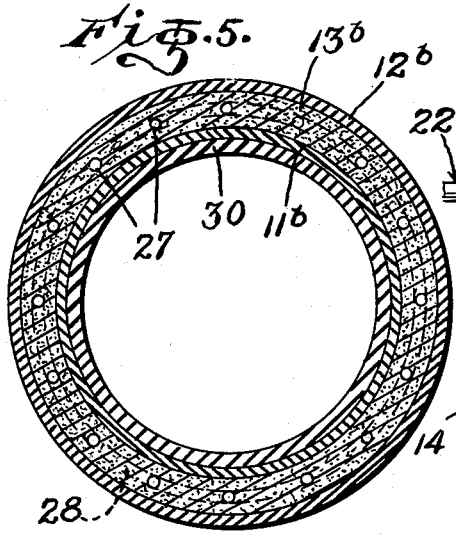
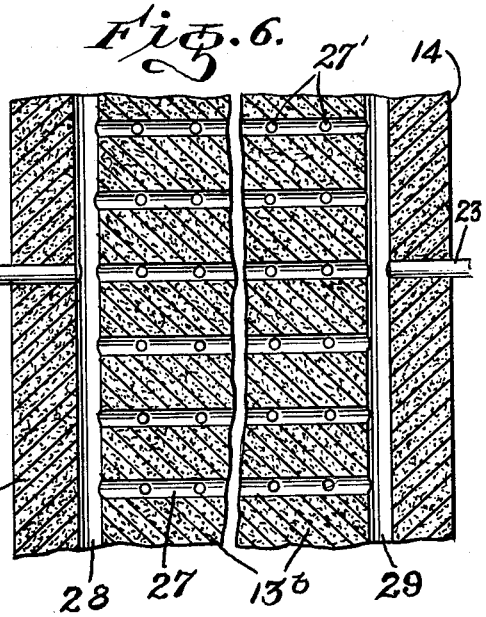
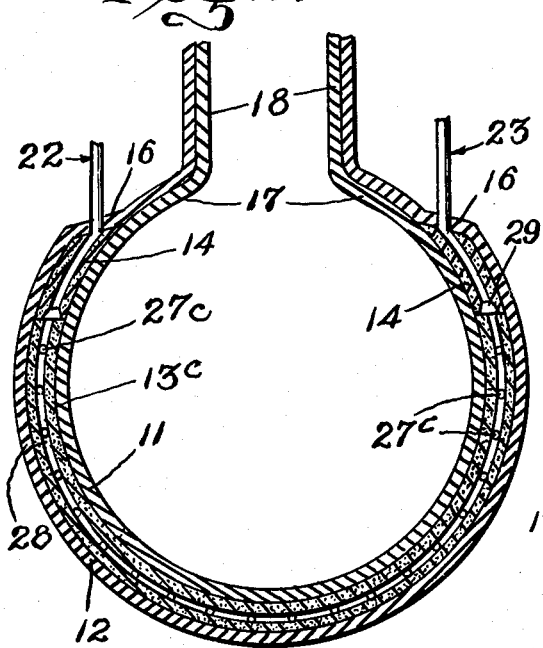
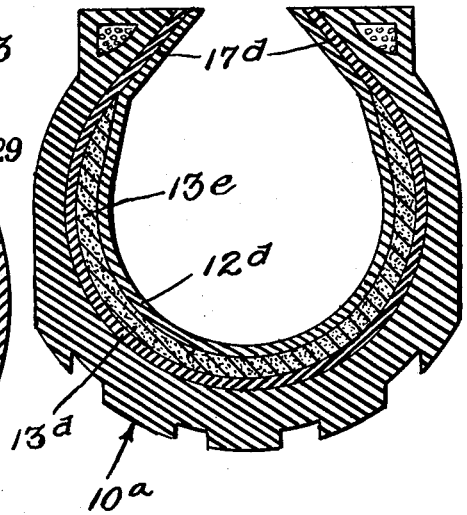
INVENTOR.
Hansford D. Hurt

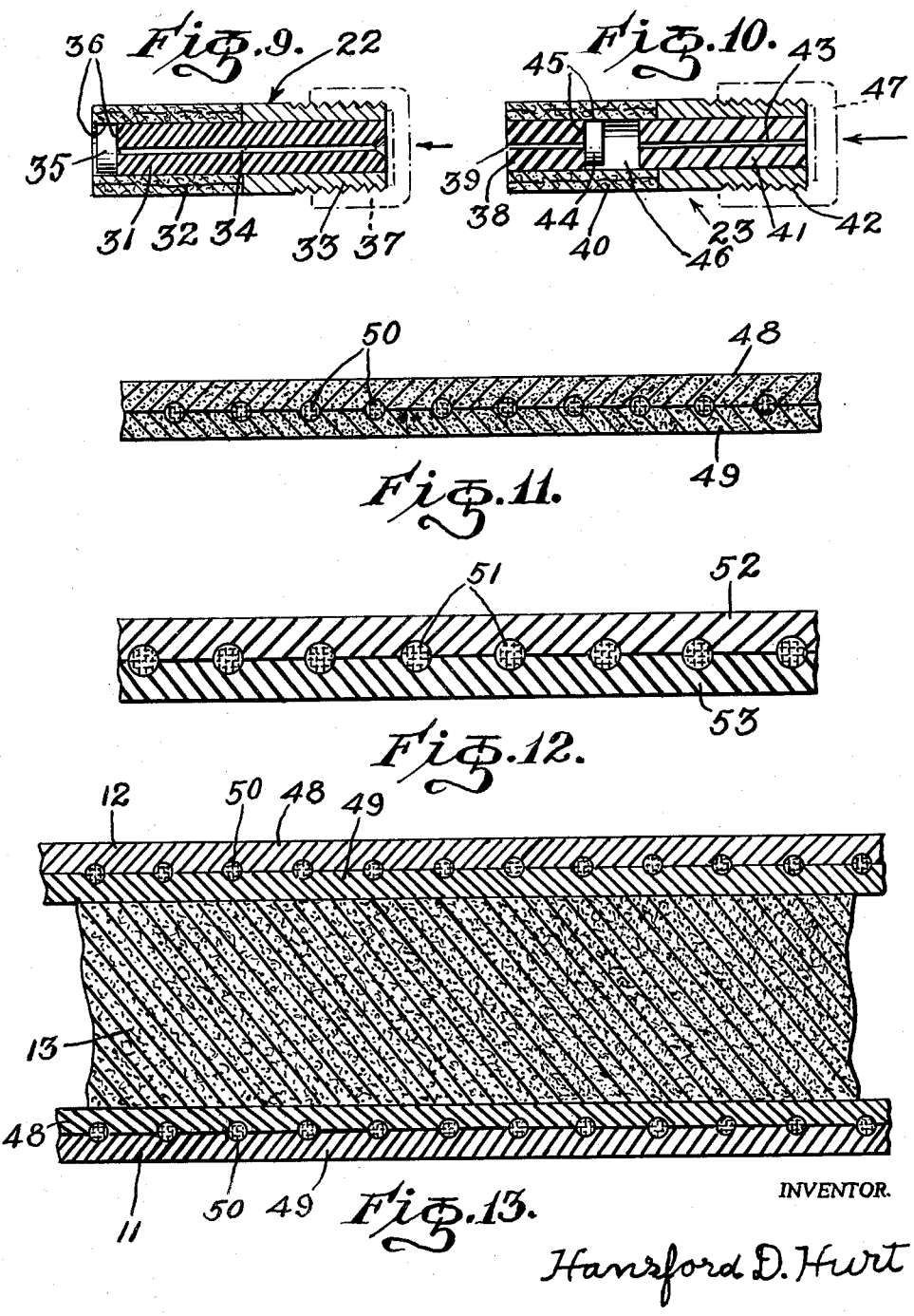

2,925,846

MULTISERVICE PROTECTOR UNIT FOR
PNEUMATIC TIRES AND TUBES

Hansford D. Hurt, Arlington, Calif.

Application February 8, 1957, Serial No. 639,030

15 Claims. (Cl. 152—347)

This invention relates to pneumatic tires and tubes and more particularly to a novel and versatile device which will improve new tires and inner tubes when joined thereto as a permanent part thereof.

A principal object of the present invention is to provide a multipurpose protector unit of simple and rugged construction which will greatly increase the life and service functions of tires and inner tubes when applied as a part thereof.

It is another object of the present invention to provide an independent self-contained device of the above type which may serve as part of a new tire, which may serve as part of a new tube, or may serve as a permanent reliner for old tires which require new strength for recapping and longer life.

It is another object of the present invention to provide a multiservice protector unit of the above type which will combine a number of advantages into a unitary device and which will give greater protection against blowouts and punctures as well as increase the tire and tube life.

It is still another object of the present invention to provide an assembled protector unit of the above type which is circular in shape in a direction parallel to the circumferential axis of the tire or tube and which includes two strain resisting layers assembled so as to form an annular bag or envelope, and within which is positioned a filler-layer which includes a puncture closing and sealing layer.

It is still another object of the present invention to provide strain resisting layers of multi-laminate structure, each layer comprising a combination of at least two types of diverse strain resisting elements.

It is still another object of the present invention to provide a puncture safe, and practically blowout-proof inner tube and which when used in the average used or recapped tire will cause it to render trouble-free service, insure against rim cuts and air seep leakage and which will require less frequent checking of air pressure.

Other objects of the invention are to provide a multiservice protector unit for pneumatic tires and tubes bearing the above objects in mind which is of simple construction, has a minimum number of parts, is inexpensive to manufacture and efficient in operation and use.

For other objects and for a better understanding of the invention, reference may be had to the following detailed description taken in connection with the accompanying drawing, in which:

Figure 1 is a transverse vertical sectional view of a preferred embodiment of the present invention shown in operative use with a new tire;

Fig. 2 is a transverse vertical sectional view of the invention shown alone before application to the tire of Fig. 1;

Fig. 3 is a transverse vertical sectional view of a modified form of the present invention shown in operative use on the outside of a new inner tube shown deflated;

Fig. 4 is a transverse vertical sectional view of a still further modified form of the present invention shown in operative use on the inside of a new inner tube, the latter being shown deflated;

Fig. 5 is a longitudinal vertical sectional view of a still further modified form of the present invention, taken parallel to the plane of symmetry of the inner tube;

Fig. 6 is an enlarged fragmentary horizontal sectional view taken along the center of the form of the invention of Fig. 5 when the latter is in a flattened position;

Fig. 7 is a transverse vertical sectional view similar to Fig. 2 but showing a still further modified form of the present invention;

Fig. 8 is a transverse vertical sectional view of a still further modified form of the present invention shown in operative use within the tire; and Fig. 9 is a longitudinal vertical sectional view of one type of valve adapted to permit the injection of puncture-sealing fluid into the porous structure of the sponge rubber filler layer provided to absorb and control the puncture sealing fluid;

Fig. 10 is a view similar to Fig. 9 of one type of air evacuation and air relief check valve adapted to be used with the present invention;

Fig. 11 is a fragmentary longitudinal vertical sectional view of one type of triple laminate structure that may be used to make the strain resisting layers forming a part of the invention;

Fig. 12 is a view similar to Fig. 11 of another type of triple laminate structure provided for making the bag or envelope layers of the invention;

Fig. 13 is a fragmentary enlarged longitudinal vertical sectional view, taken parallel to the plane of symmetry of the tube, illustrating the employment of the strain structure of Fig. 11;

Fig. 14 is a fragmentary horizontal sectional view through the structure of Fig. 13 illustrating the manner in which the embedded nylon filaments in the opposing strain resisting layers are disposed in opposite angular relationship to each other;

Fig. 15 is a fragmentary vertical longitudinal sectional view of yet another type of multi-laminate structure adapted for making the sides or strain resisting layers of the invention; and Fig. 16 is a fragmentary vertical longitudinal sectional view illustrating the use of the strain resistant tape of Fig. 15.

Referring now more in detail to the drawing, and more particularly to Figs. 1 and 2, 10 indicates generally a new tire, substantially as illustrated.

In the practice of my invention, a multiservice protector unit is applied to the interior of the tire 10 and includes an inner wall or layer 11 and an outer wall or layer 12. The annular outer layer 12 is substantially of channel-shaped cross-section and is open towards its center, namely, toward the axis of the tire with which it is employed. Said channel-shaped layer may be considered as having a main body portion, namely, the portion which will be disposed adjacent the tread of the tire, and opposite side wall portions extending inwardly from said main body portion, namely, those portions of the layer 12 which will be disposed adjacent the side walls of the tire. Thus, the edges of the opposite side wall portions of the layer 12 will be disposed inwardly toward the tire axis with respect to said main body portion of layer 12. Inner layer 11 is located inside outer layer 12 and also opens inwardly, namely, toward the axis of the tire with which the unit is employed. Said inner layer 11 is also of channel-shaped cross-section and can be considered as likewise having side wall portions. Said last-named side wall portions have edges which are disposed adjacent the edges of the side walls of the outer layer 12. A sponge neoprene or sponge rubber layer 13 is sandwiched between the layers 11 and 12 to fill the space therebetween, the layer 13 being adhesively joined to each of the layers 11 and 12 before the puncture sealing fluid is injected into the porous body of layer 13.

Annular bands 14, preferably made of gum plastic or rubber, occupy the narrow extended space intermediate the layers 11 and 12 opposite the upper edges of the layer 13. The outer layer 12 is joined to the inner standard cord layer 15 of the tire 10 throughout its contact area with the same.

The outer layer 12 joins the inner layer 11 above the annular bands 14 along the bevelled surface 16, the layers 11 and 12 being joined together along the extended portions 17 and 18. As shown in Fig. 1 the extended closed layers 17 and 18 are carried around the tire beads 19 and join to the bead areas of the tire being bent downwardly at opposite sides as at 20. Annular layers 21 of soft rubber are joined to the outside of the side portions 20 and provide a good seal with the wheel rim, not shown, in the event that the tire is of the tubeless type.

Referring to Fig. 1, 22 represents the inactive sealed off portion of a puncture fluid injecting valve and 23 represents the inactive sealed off portion of an air expulsion valve.

Referring to Fig. 2, it will be seen that the annular band layers 14 which occupy the extended spaces opposite the lateral edges of the layer 13 have openings therethrough which extend through the bevelled portion 16 of the outer layer 12 and within which are positioned the slender and flexible valves 22 and 23. Since the layers 11 and 12 are of channel-shaped cross-section and are substantially symmetrical with respect to a common vertical plane, the "side wall portions" thereof are located at opposite sides of the layers with respect to the plane of symmetry of said layers. The conduit or valve elements 22 and 23 therefore extend through side wall portions of the layer 12 at opposite sides (with respect to said plane of symmetry) of the layer 12. Said valve elements may alternatively extend through side wall portions of the inner layer at opposite sides (with respect to the plane of symmetry) of said inner layer, as in the embodiments illustrated in Figures 3 and 4. The valve 22 is adapted for puncture seal fluid injection into the porous layer 13 while the valve 23 is adapted for air expulsion from the layer 13 before filling with said fluid. The valves 22 and 23 are purposely extended beyond the bevelled areas 16 so that in the event the unit is placed in a rigid form to load up with the puncture seal fluid, the valves can be easily reached. After the valves 22 and 23 have served their purpose, their external portions are cut off flush with the bevelled areas 16 as shown in Fig. 1 and sealed off.

Due to my unusual laminate structure to be hereinafter described, and the inherent properties of the joined materials, the two strain resisting layers 11 and 12 will be much stronger than any two standard cord layers. Therefore, before incorporating the invention in a new tire carcass, it is recommended that a lessened number of standard cord layers be employed in the new tire carcass. The number of layers to be omitted is a matter best decided by the manufacturer, but it can be stated that at least two plys may be omitted from the average tire. This is preferably joined to a new tire carcass before it leaves the building drum, and before said carcass is shaped for finishing. Due to the improved strain resisting layers 11 and 12 of the invention, it is believed that tires and tubes will be improved when protected by the same. The invention includes the two specially constructed synthetic filament reinforced walls or layers 11 and 12 which are spaced apart circumferentially throughout the major portion of their width, but at opposite points near their edges their surfaces come together and are joined, thus forming the circumferential bag or envelope of impervious nature that encloses the annular space which is filled in with a puncture sealing body or filler 13, which latter is joined to the bag or envelope structure.

Referring now particularly to Fig. 3, there is shown a modified form of the present invention applied to the outside of an inner tube 24 whereby to improve the latter. Here again a pair of strain resisting layers 11a and 12a are provided on opposite sides of the layer 13a. Annular bands 14a of sponge rubber are positioned intermediate the extended portions of the layers 11a and 12a across the opposite edges of the layer 13a and the inner layer 11a is joined to the outer layer 12a along the extended portion 17a in a manner similar to the previous form, the inner layer 11a extending across the top of the band 14a and the bevelled portion 16a. Thus the strain resisting layers 11a and 12a which form the bag or envelope structure are brought together and hermetically sealed at 17a on each side. Here again, across the body of the annular bands 14a are embedded the inactive portions of the valves 22 and 23, previously referred to. The layer 13a is again saturated with a gummy thick fluid puncture sealant. The inner elastic annular envelope 24 is joined to the wall or layer 11a and to an annular member of U-shaped cross section 25 of gum rubber or plastic, substantially as illustrated and through which extends a valve 26 for inflating the inner tube 24. The lower edges of the member 25 are bevelled upwardly and outwardly so as to lie flush with the bevelled portions 16a of the inner layer 11a and are recessed on opposite outwardly facing sides to accommodate the extended portions 17a. This type of tube is preferably given a superficial coating 9 over the exterior thereof which may be accomplished by spraying or painting on a thin coat of liquid rubber.

Referring now particularly to Fig. 4, there is shown a still further modified form of the present invention wherein the multiservice protector unit of Fig. 3 is now applied to the inside of the inner tube 24b, the latter being shown in deflated condition. The outer elastic envelope 24b of suitable inner tube stock is joined to the layer 12a and also to the member 25. The inner circumferential band member 25 of elastic gum rubber or plastic is joined to the shoulder and edge areas of the invention as previously described in connection with Fig. 3. In order to obtain full benefit of the reinforced area of my improved inner tube, the lateral edges thereof should extend to a point above or beyond the pair of joints formed by the edges of the wheel rim and the tire mounted thereon.

In other respects the form of the invention shown in Fig. 4 is the same as that shown on Fig. 3 and like reference numerals identify like parts throughout the several views.

In the forms of the invention of Figs. 3 and 4, the protruding portions of the valves 22 and 23 will normally extend beyond the bevelled portions 16a until after the fluid has been forced into the layer 13a after which they will be cut off flush with the bevelled areas 16a.

Preferably, the layers 13 and 13a of Figs. 1 through 4 will be provided with transverse bores 27' which extend from the inner to the outer faces of the layers and spaced apart evenly in the circumferential center areas 13a and 13. The bores or perforations 27' will provide thorough and quick distribution of the sealant fluid, as will be obvious. The layers 13 and 13a will also be provided with a circumferential bore 28 which connects with the sealant fluid injection valve 22, previously described. The layers 13 and 13a will also be provided with second circumferential fluid passages 29 which are connected to the air expulsion valve 23 previously described. Further bores, such as are shown at 27 in Figure 6, are provided which intersect the bores 27' and connect the circumferential bores 28 and 29 to provide thorough and quick distribution of sealing fluid, as will be obvious.

Referring now particularly to Figs. 5 and 6, there is shown a still further modified form of the present invention in the form of an endless band or loop and showing the construction of the same before application to the tire. In this form of the invention, a building drum 30 is required onto which is applied the inner layer 11b and the outer layer 12b forming an annular chamber within which is positioned the layer 13b, for the same purpose as in the previous forms. The building drum 30 will be of the same type employed for tire building. The layer 13b is provided with perforations 27, extending laterally from edge to edge of the layer 13b and spaced apart evenly in the circumferential center area of the layer whereby to provide thorough and quick distribution of the sealant fluid. As shown in Fig. 6, the puncture sealant fluid injection valve 22 connects with the circumferential fluid passage 28 which is formed in the annular member 13b, the latter being similar in purpose and construction with the annular band 13 previously described. The air expulsion valve 23 connects with the circumferential fluid passage 29 previously described which is formed in the annular member 13b. The spaced fluid passages 27, it will be noted, extend from one passage 28 to the other passage 29 and are disposed around the circumferential center area of layer 13b, to provide thorough and quick distribution of sealant fluid.

Referring now particularly to Fig. 7, there is shown a still further modified form of the invention wherein the intermediate layer 13c is provided with the circumferentially spaced bores 27c which connect directly with the circumferential bores 28 and 29. The circumferential bore 28 connects with the puncture sealant fluid injection valve 22 while the circumferential bore 29 connects with the air expulsion valve 23.

In other respects the form of the invention shown in Fig. 7 is similar to that shown in Figs. 1 and 2, and like reference numerals identify like parts throughout the several views.

Referring now particularly to Fig. 8, there is shown a still further modified form of the present invention designed as a permanent reliner for used tires 10a. In this form the outside layer 13d is joined to the inside of the tire 10a and the layer 12d comprising the inner layer is curved inwardly more uniformly towards the outer layer and is joined thereto at 17d. The layers 12d and 13d as in the previous forms enclose an inner filled layer 13e which is all gum plastic or gum rubber. Alternately the layer 13e may be a blend or composition of gum rubbers or plastics and is impregnated with the sealant fluid. In this form of the invention, there is provided a substitute for the forms previously described although the puncture sealing efficiency is somewhat less. It would appear that a spongy material loaded with the sealant fluid under air pressure would be more certain to seal punctures as the tire rolls, or when the sharp object is removed.

Referring now particularly to Fig. 9, the valve 22 previously referred to is shown more in detail. It includes a tough rubber core 31 covered by a fabric reinforced sleeve 32 at its inner end and by a threaded sleeve 33 of hard plastic or metal at its outer end, substantially as illustrated. The core 31 is provided with the fine small diameter, longitudinal bore 34 through which the sealant fluid is injected and 35 represents a stiff rubber flap disc which opens and closes the passage 34 at the inner end thereof, the flap disc 35 being secured to the sleeve 32 and core 31 at a marginal portion thereof, as at 36. If it is desired to render this valve inactive temporarily, an internally threaded closure cap 37 may be screwed onto the sleeve 33 to close the open end thereof.

Referring now to Fig. 10, there is shown an enlarged view of the evacuation valve 23 previously referred to. This is an air relief or evacuation valve adapted to connect with a vacuum pump, not shown, and includes a short rubber core 38 having a relatively narrow longitudinal bore 39 which is positioned within one end of the fabric reinforced sleeve 40.

A second hard rubber core 41 is secured within the other end of the sleeve 40 and extends to the opposite end of said sleeve. On the end of the sleeve is mounted the externally threaded metal or hard plastic sleeve 42, the core 41 having the relatively narrow longitudinal bore 43. A check flap disc 44 abuts the outer end of the core 38, the disc 44 being joined at a marginal portion thereof to the core 38 and the sleeve 40 at the points 45 and being movable in the chamber 46 provided within the sleeve intermediate the cores 38 and 41. The disc 44 opens or closes the passage 39 by flexing into the chamber 46, which allows the air to escape through the rubber core 41 by means of the bore 43 thereof. If it is desired to render this valve inactive temporarily, an internally threaded closure cap 47 may be screwed onto the sleeve 42.

Preferably a specially suited injector gun, not shown, will be used to engage the valve 22 and pump in a predetermined amount of suitable puncture sealant compound or composition, such as latex or comminuted rubber mixed with liquid hydrocarbon material, commercially available and in itself forming no part of the present invention. The said gun should be preferably hand operated, with a trigger release and shutoff device and equipped with a slender probe having a longitudinal fluid passage therein and a rounded forward end. By this means the layers 13 and 13a may be quickly loaded with fluid sealant which is carried to all parts of the layer by the passages 27', 27, 28 and 29 and which under pressure, saturates the spongy material.

Referring now particularly to Fig. 11, there is shown one type of triple laminate structure composed of at least two types of strain resistant elements combined into a unit layer and proposed as one type of strain resisting walled layer for making the layers 11 and 12 previously referred to. Sheets of substantially inelastic, flexible film material 48 and 49, such as Mylar, a synthetic polyester dimension retaining sheet plastic material manufactured by E. I. du Pont de Nemours and Company, Wilmington, Delaware, are joined by suitable flexible adhesive. Plastic filaments 50 of nylon or the like are laid closely side by side and embedded between the sheets 48 and 49.

Referring now particularly to Fig. 12, there is shown another fragmentary vertical cross-section of a triple laminate structure composed of two types of strain resisting elements combined into a unitary layer of strain resisting material for making the layers 11 and 12 previously described. In this form nylon cords 51 are sandwiched between the sheets 52 and 53 of Mylar, or the like, the parts being sandwiched together and joined together as a unit with the nylon cords 51 being closely laid side by side between the sheets 52 and 53.

Referring now particularly to Fig. 15, there is shown another multiple laminate structure composed of two types of strain resisting elements combined into a unitary layer to provide a third type of strain resisting wall or layer for constructing the layers 11 and 12 previously described. Here a Mylar polyester sheet 54 is adhesively bound to the longitudinally reinforced tapes 55 which are joined edge to edge as at 56.

Fig. 13 illustrates the construction of the device showing the layer 13 sandwiched between the inner and outer layers 11 and 12, each of the layers of strain resistant material 11 and 12 being formed from the polyester sheets 48 and 49 which are secured together about the nylon filaments 50 referred to in Fig. 11. Fig. 14, which is a horizontal section through Fig. 13, illustrates the same layer structure for the walls 11 and 12 on each side of the layer 13 and indicates the direction of the embedded filaments 50 in the strain layers 11 and 12 on each side of layer 13, showing that they are disposed at angles similar to the cords in two joined standard cord layers.

Referring now particularly to Fig. 16, the invention is shown constructed in accordance with the triple laminate structure of Fig. 15. The strain resistant tapes 55 disposed in edge to edge relation are laid in angular directions corresponding to the filaments 50 of Fig. 14.

In practice, I believe the invention should be loaded with the puncture seal fluid compound as soon as the parts are assembled and joined, and before the device is removed from the building drum. It is believed that it will be necessary to employ a special rigid form designed in such manner and shape that it can be used to quickly surround the protector unit while it is on the building drum. The purpose of said rigid form is to prevent any change in thickness of the protector unit, when the puncture seal fluid is pumped in under pressure. It is suggested that two semi-annular rigid members movable mechanically or with hydraulic means for forming a rigid band entirely around the protector unit may be used after assembly on the building drum. Of course, while the invention is on the drum, it is in the unshaped band form. Therefore, the rigid metal band members which surround the invention should have a lateral width which spans the width of the invention between the tapered or shouldered areas indicated previously. This will leave the extended valves in a position easy to reach and use.

The reason for employing sponge neoprene for a tough porous matrix in which to store the thick fluid sealant resides in the fact that this will prevent centrifugal forces in a fast moving tire from destroying the even distribution of said sealant. It may be necessary to elevate the temperatures of some fluid sealants in order to expedite the injection of the same. In Figs. 11 through 15, there have been shown improved reinforcing structures which it is believed are much stronger than tire cord layers and yet will be relatively thin. This is due to the employment of the Mylar polyester dimension retaining sheet which can be produced in thicknesses as small as 0.0075 inch. This material is believed to possess one-third the strength of machine steel and in the structure which I propose for creating the inner and outer layers 11 and 12, the polyester dimension retaining sheet not only adds its tensile strength to the tensile strength of the embedded filaments or cords, but the said polyester sheet will also add its tensile strength in all other directions parallel to the surfaces of the layers 11 and 12. Therefore, the layers 11 and 12 provide for great tensile strength resistance against lateral separation of the fibrous material embedded therein. It is believed that my reinforcing structure as described above is novel and represents an improvement over the prior art in realization of the great strength provided. It represents a considerable improvement over the strain structures previously known.

While various changes may be made in the detail construction, it shall be understood that such changes shall be within the spirit and scope of the present invention as defined by the appended claims.

What I claim as new and desire to protect by Letters Patent of the United States is:

1. In a protective device of the character described, an annular outer layer of flexible, substantially inelastic material of channel-shaped cross-section opening toward its axis and having a peripheral main body portion and opposite side wall portions extending inwardly from said main body portion toward said axis, whereby the edges of said side wall portions are disposed inwardly relative to said main body portion, an annular inner layer of flexible, substantially inelastic material of channel-shaped cross-section disposed inside said outer layer and also opening inwardly toward said axis, said inner layer having side walls whose edges are disposed adjacent the edges of said first-named side wall portions, an intermediate annular layer of porous resilient deformable material disposed between said outer and inner layers, means sealingly securing the respective adjacent edges of the side walls of said inner and outer layers together, a quantity of sealing liquid dispersed through said intermediate porous layer, and conduit means extending through respective side wall portions of the layers at opposite sides of said plane of symmetry for injecting the sealing liquid into one side and for allowing air to exhaust from the other side.

2. The structure of claim 1, and wherein said intermediate layer is formed with a plurality of relatively small intercommunicating passages distributed through its volume.

3. The structure of claim 1, and wherein at least one of the layers of substantially inelastic material comprises a pair of laminae of flexible, substantially inelastic sheet plastic material and a plurality of flexible, substantially inelastic plastic filaments secured in parallel relationship between said laminae.

4. The structure of claim 1, and wherein said layers of substantially inelastic material each comprises a pair of laminae of flexible, substantially inelastic sheet plastic material and spaced parallel filaments of flexible, substantially inelastic plastic material secured between said laminae.

5. The structure of claim 1, and wherein at least one of the layers of substantially inelastic flexible material comprises a lamination of flexible, substantially inelastic sheet plastic material and a plurality of elongated, side-by-side substantially inelastic, flexible plastic members secured to said lamination and extending at a substantial angle to the plane of symmetry of the annular layers.

6. The structure of claim 1, and wherein at least one of the layers of substantially inelastic flexible material comprises a pair of laminae of substantially inelastic flexible sheet plastic material and spaced parallel filaments of substantially inelastic flexible plastic material secured between said laminae and extending at a substantial angle to the plane of symmetry of the annular layers.

7. The structure of claim 1, and wherein at least one of the layers of substantially inelastic material comprises a lamination of flexible, substantially inelastic sheet plastic material and side-by-side flexible, substantially inelastic plastic tapes secured to said lamination and extending at a substantial angle to the plane of symmetry of the annular layers.

8. In a protective device of the charatcer described, an annular outer layer of flexible, substantially inelastic material of channel-shaped cross-section opening toward its axis and having a peripheral main body portion and opposite side wall portions extending inwardly from said main body portion toward said axis, whereby the edges of said side wall portions are disposed inwardly relative to said main body portion, an annular inner layer of flexible, substantially inelastic material of channel-shaped cross-section disposed inside said outer layer and also opening inwardly toward said axis, said inner layer having side walls whose edges are disposed adjacent the edges of said first-named side wall portions, an intermediate annular layer of porous resilient deformable material disposed between said outer and inner layers, means sealingly securing the respective adjacent edges of the side walls of said inner and outer layers together, a quantity of sealing liquid dispersed through said intermediate porous layer, and respective conduit elements communicatively connected to the opposite sides of said intermediate layer and extending through marginal portions of one of the layers of inelastic material at opposite sides of said plane of symmetry, whereby the sealing liquid may be injected into one side of said intermediate layer and whereby air may be discharged from the other side thereof during impregnation of said intermediate layer with the sealing liquid.

9. In a protective device of the character described, an annular outer layer of flexible, substantially inelastic material of channel-shaped cross-section opening toward its axis and having a peripheral main body portion and opposite side wall portions extending inwardly from said main body portion toward said axis, whereby the edges of said side wall portions are disposed inwardly relative to said main body portion, an annular inner layer of flexible, substantially inelastic material of channel-shaped cross-section disposed inside said outer layer and also opening inwardly toward said axis, said inner layer having side walls whose edges are disposed adjacent the edges of said first-named side wall portions, an intermediate annular layer of porous resilient deformable material disposed between said outer and inner layers, means sealingly securing the respective adjacent edges of the side walls of said inner and outer layers together, and a quantity of sealing liquid dispersed through said intermediate porous layer, said intermediate layer being formed with relatively small continuous respective circumferential passages adjacent its side edges and with additional relatively small transverse passages communicatively connecting said circumferential passages and distributed around said intermediate layer.

10. The structure of claim 9, and respective conduit elements at the side marginal portions of said intermediate layer communicatively connected to said circumferential passages and extending through marginal portions of one of said layers of substantially inelastic material at opposite sides of said plane of symmetry, whereby the sealing liquid may be injected into one side of said intermediate layer and whereby air may be discharged from the other side thereof during impregnation of said intermediate layer with the sealing liquid.

11. The structure of claim 10, and wherein said conduit elements extend through the side marginal portions of the outer layer of substantially inelastic material.

12. In a vehicle tire, an annular main body, a first annular layer of flexible, substantially inelastic material mounted in said main body, said layer conforming in contour with the inside surface of said main body and having a main body portion and opposite side wall portions extending inwardly from said main body portion toward the axis of said main body, whereby the edges of said side wall portions are disposed inwardly relative to said main body portion, a second annular layer of flexible, substantially inelastic material disposed within said first annular layer, said second layer having side walls whose edges are disposed adjacent the edges of said side wall portions, an intermediate annular layer of porous resilient deformable material disposed between said first and second layers, means sealingly securing the respective edges of the side walls of the first and second layers together at the opposite sides of the plane of symmetry thereof, whereby to sealingly enclose said intermediate layer, and a quantity of sealing liquid dispersed through said intermediate layer.

13. The structure of claim 12, and respective conduit elements communicatively connected to the opposite sides of said intermediate layer and extending through marginal portions of one of said substantially inelastic layers on opposite sides of said plane of symmetry, whereby sealing liquid may be injected into one side of said intermediate layer and whereby air may be discharged from the other side thereof during impregnation of said intermediate layer with said sealing liquid.

14. The structure of claim 13, and wherein said intermediate layer is formed with a plurality of relatively small passages intercommunicating with each other and distributed throughout the volume of said intermediate layer.

15. In a vehicle tire, an annular main body, a first annular layer of flexible, substantially inelastic material mounted in said main body, said layer conforming in contour with the inside surface of said main body and having a main body portion and opposite side wall portions extending inwardly from said main body portion toward the axis of said main body, whereby the edges of said side wall portions are disposed inwardly relative to said main body portion, a second annular layer of flexible, substantially inelastic material disposed within said first annular layer, said second layer having side walls whose edges are disposed adjacent the edges of said side wall portions, an intermediate annular layer of porous resilient deformable material disposed between said first and second layers, means sealingly securing the respective edges of the side walls of the first and second layers together at the opposite sides of the plane of symmetry thereof, whereby to sealingly enclose said intermediate layer, said intermediate layer being formed with respective relatively small continuous circumferential passages adjacent its side edges and with additional relatively small transverse passages communicatively connecting said circumferential passages and distributed around said intermediate layer, a quantity of sealing liquid dispersed through said intermediate layer, and respective conduit elements at the respective side marginal portions of said intermediate layer communicatively connected to said circumferential passages and extending through the side marginal portions of one of said layers of substantially inelastic material at opposite sides of said plane of symmetry, whereby the sealing liquid may be injected into one side of said intermediate layer and whereby air may be discharged from the other side thereof during impregnation of said intermediate layer with the sealing liquid.

References Cited in the file of this patent

UNITED STATES PATENTS

| | | |
|---|---|---|
| 485,898 | Sweeting | Nov. 8, 1892 |
| 1,427,278 | Fetter | Aug. 29, 1922 |
| 2,237,245 | Wilson et al. | Apr. 1, 1941 |
| 2,438,965 | Dasher | Apr. 6, 1948 |
| 2,712,338 | Hurt | July 5, 1955 |